United States Patent [19]
Korth

[11] Patent Number: 4,574,552
[45] Date of Patent: Mar. 11, 1986

[54] SUPPORT FRAME

[75] Inventor: Bernd Korth, Weil am Rhein, Fed. Rep. of Germany

[73] Assignee: Protoned B.V, Amsterdam, Netherlands

[21] Appl. No.: 421,013

[22] Filed: Sep. 21, 1982

[30] Foreign Application Priority Data

Oct. 30, 1981 [CH] Switzerland ............... 6962/81

[51] Int. Cl.[4] ............................................. F16B 7/04
[52] U.S. Cl. ........................................ 52/645; 52/669; 52/690; 403/297
[58] Field of Search ............... 403/297, 255, 252, 405; 52/282, 645, 665, 690, 669

[56] References Cited

U.S. PATENT DOCUMENTS

| 3,338,602 | 8/1967 | Arnd ................... 403/297 |
| 3,574,367 | 4/1971 | Jankowski ........... 403/297 |
| 3,966,342 | 6/1976 | Moriya ................. 403/297 |
| 4,388,786 | 6/1983 | Gassler ................ 52/282 |
| 4,485,597 | 12/1984 | Worrallo ............ 52/488 |

FOREIGN PATENT DOCUMENTS

| 514900 | 7/1979 | Australia . |
| 8458675 | 10/1979 | Australia . |
| 2059829 | 5/1972 | Fed. Rep. of Germany ...... 403/297 |
| 2108342 | 9/1972 | Fed. Rep. of Germany . |
| 2256919 | 11/1972 | Fed. Rep. of Germany . |
| 1550451 | 11/1968 | France . |
| 368474 | 3/1932 | United Kingdom ........ 403/297 |
| 415946 | 9/1934 | United Kingdom ........ 403/297 |
| 421871 | 1/1935 | United Kingdom ........ 403/297 |
| 608090 | 9/1948 | United Kingdom ........ 403/297 |
| 1254723 | 11/1971 | United Kingdom . |
| 1519916 | 8/1978 | United Kingdom . |
| 1594928 | 8/1981 | United Kingdom . |
| 2109500 | 6/1983 | United Kingdom . |

*Primary Examiner*—John E. Murtagh
*Attorney, Agent, or Firm*—Ladas & Parry

[57] ABSTRACT

Cross-beams, located between column elements of the support frame, contain, at their beam-ends, clamping members which are mounted inside a cavity in the cross-beam body in a manner permitting displacement in the longitudinal direction of the cross-beam, and are capable of being brought into, and out of, engagement with the column elements. These clamping members are expanding elements, coupled together and guided so that they move in pairs, their head part, which engages into the column element, being provided with clamping means and centering means, and being capable of being pushed completely back into the cross-beam cavity. The expanding elements can be forced apart from each other, in a parallel relationship, perpendicularly to the longitudinal axis of the cross-beam, by means of a socket-head screw which can be operated from the outside of the cross-beam.

The design of the clamping members on the cross-beams permits the installation of cross-beams between columns which are already fixed, without dismantling any part whatsoever.

4 Claims, 3 Drawing Figures

SUPPORT FRAME

BACKGROUND OF THE INVENTION

The invention relates to a support frame which is assembled according to the modular principle, with supporting, or column, elements and cross-beam elements.

For the rapid assembly and dismantling of column-type support frames, built from standard parts or standard-specification parts, it is known to use cross-beam elements which are connected to the supporting columns by means of screw members or clamping members, or by means of members which are capable of being hooked in, these cross-beam elements connecting, in each case, two adjacent columns one to the other. Furthermore, support fames of this type have become known, in which the cross-beam connection-points on the columns are designed in such a manner that, in the erected condition of the cross-beams, no parts are present which project beyond the column-profile and do not themselves serve a supporting or bracing function.

Cross-beam elements, designed as described above, for use in support frames assembled according to the modular principle, possess engagement means which are, for example, invisible in the erected condition, project outwards beyond the end of the cross-beam and bring about, by rotation or a wedging action, a secure connection between cross-beam and column. However, due to the fact that the engagement means project outwards beyond the end of the cross-beam, construction can advance only under "free" conditions, because cross-beams of this type cannot be installed between pre-existing, fixed columns.

DESCRIPTION OF THE PREFERRED EMBODIMENT

The present invention aims to provide a support frame, in which length-standardised cross-beam elements can be used, these elements also being capable of installation in closed frame-structures which are already in existence and are composed of column elements, or other supporting elements, and transverse connections, without any necessity to dismantle parts of these structures.

The object of the invention is consequently to design the engagement members at both cross-beam ends in such a manner that they are capable of being brought, as required, into a retraction position or into a use position, and are capable, both in the retraction position and in the use position, of being locked with respect to the cross-beam body. By this means, the intention is to ensure that standard-specification cross-beam elements can be installed even between supporting elements, or columns, which are fixed at intervals corresponding to the cross-beam length, without any necessity to dismantle one of the supporting elements.

The means whereby this object is achieved are evident from patent claim 1, while preferred embodiments of the subject of the invention are defined by the dependent claims.

BRIEF DESCRIPTION OF THE DRAWINGS

In the text which follows, the invention is described by reference to the drawing, in which.

In the Figures, identical reference numbers denote identical components.

Figure 1:
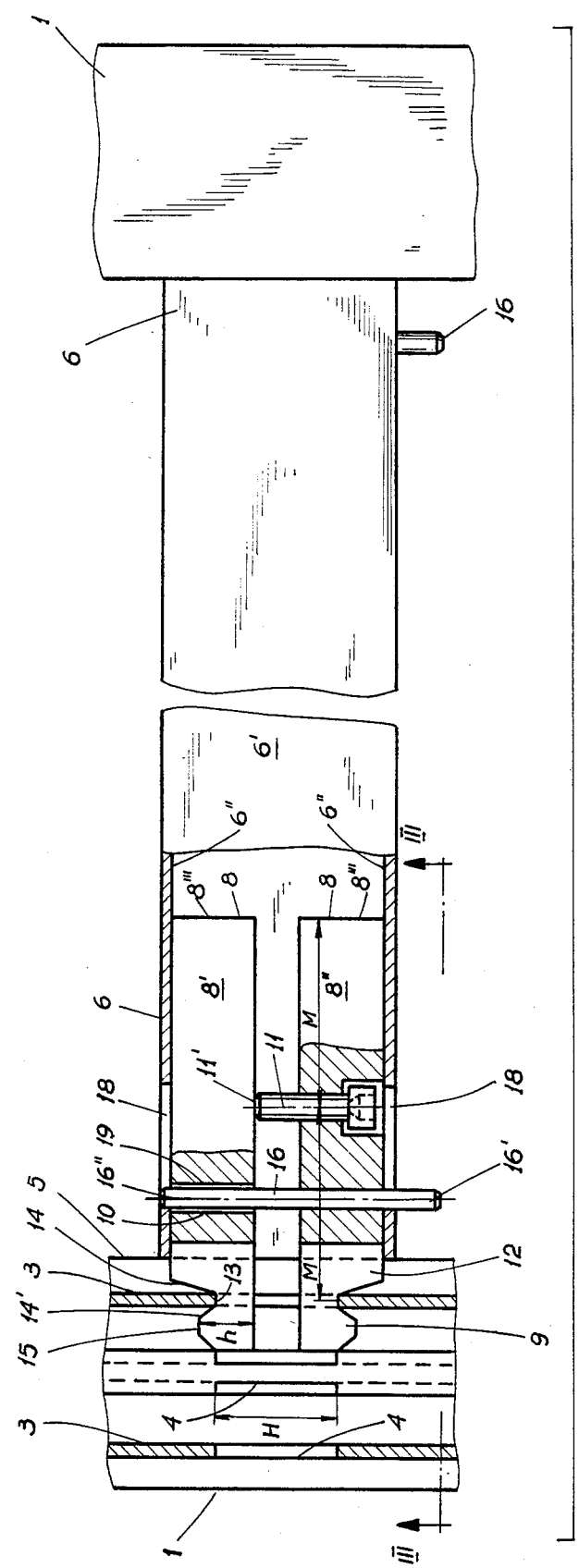
FIG. 1 shows, in section, the connection of a cross-beam to a supporting column which is provided with engagement slots.
Figure 2:
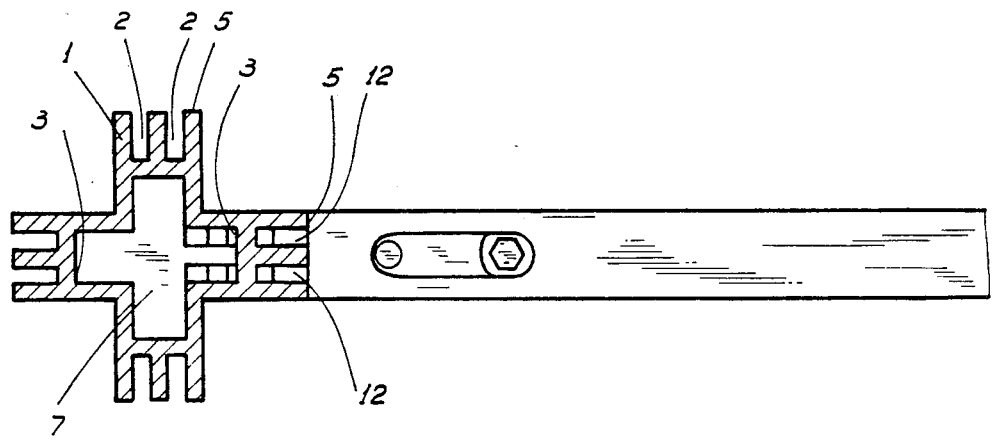
FIG. 2 shows a partially sectioned view in the plane III—III according to FIG. 1

The example shows, as a supporting element, a typical cruciform column 1, with two channels 2, serving engagement or centering functions, the bottoms of these channels being formed by a wall 3 of the profile-section, this wall being located at right angles to that particular arm of the cross which is being considered, longitudinal slots 4 being made at regular intervals in this wall. The ends 5 of the arms of the cross, on the outside in the radial direction, act as a stop-surface for the cross-beam 6 which is to be connected to the column 1. A cruciform cavity 7 is located inside the cruciform profile-section, this cavity being bounded, in the radially outward direction, by the walls 3 of the profile-section.

The body of the cross-beam 6 is shown as a rectangular tube 6', a pair 8 of expanding elements being inserted into each of its two end regions. The individual expanding elements 8', 8" are elongate metal rails, possessing a rectangular cross-section and, lying with their narrow sides superimposed, being longitudinally guided in the interior of the tube, in a manner permitting lateral movement. Each element comprises a head part 9, which is matched to the clamping-attachment zone in the region of the longitudinal slots 4 on the column 1, a parallel guide 10, coupling the two expanding elements 8', 8" together, and a clamping screw 11, by means of which the two expanding elements 8', 8" establish an engagement, which is frictional in nature, between the column 1 and the cross-beam 6.

The head parts 9 of the expanding elements 8', 8" are shaped, with respect to their narrow sides, which face each other, as mirror-images, and are thus identically shaped and, in the case of a cruciform profile-section with (as shown) two centering channels 2, are divided, in a fork-like manner, to form two clamping tongues 12. All the clamping tongues 12 thus possess an identical shape, exhibiting, at the end, an entry section 15 with a reduced height h, and a clamping groove 13, which is located in a central region of the tongue-outline adjoining the entry section 15, and which is bounded on both sides by inclined centering faces 14, 14'. The bottom of the clamping groove 13 is located at a height approximating to half the height of the metal rail. The height h of the entry section 15 measures somewhat less than half the height H of the longitudinal slot 4. These dimensions ensure that, when the expanding elements 8', 8" are superimposed in close contact with each other, the two head parts 9 can be pushed comfortably into the slots 4 during the process of erecting the cross-beam 6.

Figure 3:
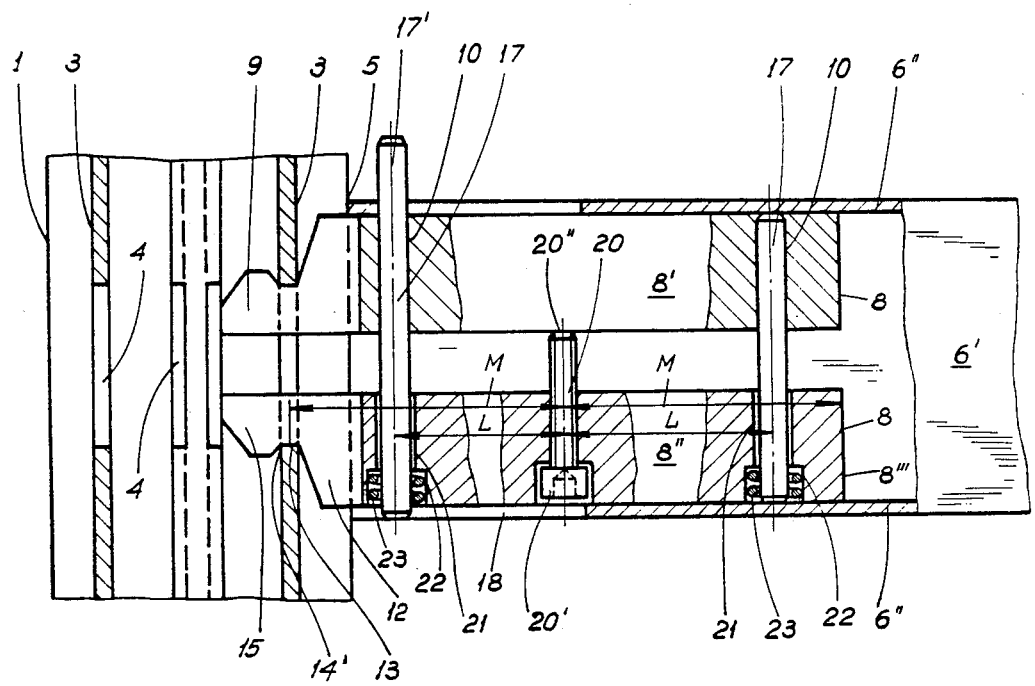
FIG. 3 shows an additional cross-beam connection, similar to FIG. 1, with a second embodiment of the clamping member.

The two expanding elements 8', 8" of the pair 8 of expanding elements are coupled together by means of the parallel guide 10, in order to prevent any mutual displacement in the longitudinal direction. In this regard, FIGS. 1 and 3 show guide pins 16 and 17, respectively, which, in each case, seat tightly in one expanding element and, in the other, are movably guided in a sliding fit. The difference, in this regard, in the cases of the embodiments according to FIGS. 1 and 3 are explained later.

The clamping screw 11 seats in a threaded bore in the lower expanding element 8", approximately at the midpoint between the wall 3 of the profile-section, as one clamping reference-point, and the end-edge 8''', as another clamping reference-point. The relevant distance-dimensions M are therefore approximately equal. The clamping screw 11 is preferably a socket-head screw with a hexagonal socket. This screw serves to force the two expanding elements 8', 8" apart from each other, in such a way that their relevant contact points on the cross-beam tube 6', and on the column 1, and/or at the column-slots 4, come into engagement, the nature of which is frictional.

The pair 8 of expanding elements is captured in the terminal section of the rectangular tube 6' forming the cross-beam, in a manner permitting displacement, and can be freely displaced between a retraction position, in which the head parts 9 are located completely in the interior of the tube 6', and a use position corresponding to its position when the cross-beam is in the erected condition. The limiting positions are fixed, in each case, by stopregions on portions of the pair 8 of expanding elements and on the cross-beam tube 6'. The stoppoint in the forward (pulled out) limiting position simultaneously forms the clamping-lock of the pair 8 of expanding elements on the cross-beam tube 6', while the stop in the rear limiting position limits the inward push-travel of the pair of expanding elements and is located at a point at which, when reached, the head part 9 is completely sunk into the interior of the tube.

In the embodiment according to FIG. 1, the forward and rear limiting positions are defined by the ends of openings 18 in the upper and lower narrow sides 6" of the cross-beam tube 6', these openings being in the form of elongated holes, through which the ends of the guide pin 16 engage, on both sides. The width of the elongated hole is selected such that, in addition to the guide pin 16, the socket-head screw key, for operating the clamping screw 11, can also pass through it. In the process of erecting the cross-beam 6, according to FIG. 1, the two expanding elements 8', 8" are brought into mutual contact, both by unscrewing the clamping screw 11 and by manually pushing the end 16' of the guide pin inwards, the pin 16 being capable of displacement in the guide bore 19 and on being displaced, emerging beyond the cross-beam surface. In this position, the two entry sections 15 of the head parts 9 of the expanding elements possess a total height 2h, which is somewhat lower than the height H of the slots 4, so that the clamping tongues 12 can be comfortably introduced into the slots 4. If the cross-beam 6 is to be coupled to a column 1, in a cantilevered manner, the pair 8 of expanding elements is pushed forward, by applying a push-force to that end 16" of the guide pin which now projects above the upper cross-beam surface, and is introduced into the slots 4. If, in contrast, the cross-beam 6 is to be inserted between two fixed columns 1, the pairs 8 of expanding elements are pushed inwards at both cross-beam ends, the cross-beam is offered up to the column at the height of the slots 4 and each pair 8 of expanding elements is then moved into the columns by pushing them outwards, up to the stop.

If the cross-beam 6 is hooked, in this manner, onto one or two columns, the clamping screw 11 is screwed in again, the two expanding elements 8', 8" being forced away from each other. In this process, the clamping groove 13 centres itself on the wall 3 of the profile-section, along the inclined centering faces 14, 14', and in doing so pulls the cross-beam 6 against the column 1. The ends 16', 16" of the guide pin 16 begin to come into tight contact with the front ends of the elongated holes 18. The contact force between the column 1 and the cross-beam 6 is generated, as the clamping screw 11 is tightened, by the wedging action deriving from the inclined centering face 14" relative to the inner surface of the profile-section wall 3, and by the reaction of the pin-ends 16', 16" which bear against the ends of the elongated holes 18. As a result of the lever force, occurring as the clamping screw 11 is tightened, between the point of engagement in the region of the clamping groove 13 and the region 11' over which the screw 11 contacts the expanding element 8', the inner ends 8''' of the expanding elements 8', 8" which, in the clamped condition extend outwards close to the inside walls 6" of the cross-beam, come to rest against the narrow faces 6" of the cross-beams. From this, there results an enhancement of the clamping action in the region of the clamping groove 13. Any slight bending stress on the guide pin 16, which may possibly occur at the same time, can be absorbed elastically.

In the embodiment according to FIG. 3, the head parts 9 are designed in fundamentally the same manner as has been described by reference to FIG. 1, so that a separate description of this part is dispensed with. Two guide pins 17 are provided for a mutually parallel guidance of the expanding elements 8', 8", the pins being located at virtually identical distances L from the clamping screw 20. One of said pins penetrates, as shown in FIG. 1, the narrow sides 6" of the traverse tube 6", while the other pin is situated completely inside the traverse tube 6'. The dowel-pins 17 seat tightly in the expanding element 8' of the pair 8 of expanding elements, and are guided in the expanding element 8", in a manner permitting displacement, in a guide bore 21. The expanding element containing the guide bores 21 contains on its outer, or lower, surface, spring housings 22, which are preferably located coaxially with the guide bores 21 and serve to receive reaction-springs 23. The mode of action of these springs is described later.

The clamping screw 20 is preferably a socket-head screw with a hexagonal socket. As described above, it is expediently located, in a threaded bore, at the longitudinal mid-point (dimensions M) between the clamping groove 13 and the end-edge 8''' of the expanding element 8". Its head 20' lies, as shown in FIG. 1, inside cross-beam 6', and is approachable from the exterior side of the cross-beam when the expanding elements 8', 8" are in the stretched state. The length and the position of the elongated hole 18 corresponds to the situation shown in FIG. 1. If the clamping screw 20 is unscrewed before the cross-beam according to FIG. 3 is erected, the expanding element 8" moves towards the expanding element 8', under the action of the reaction-springs 23, and finally rests against this element. Consequently, the entry sections 15 of the head part 9 again exhibit a total height which is somewhat lower than the height of the slots 4, so that the clamping tongues 12 can be comfortably guided into these slots. The push-force for the pair 8 of expanding elements, coupled by the two guide pins 17, is applied to the projecting portion 17' on the left-side guide pin 17.

An insertion of traverse 6 and a tightening thereof against column 1 are carried out as described above with regard to FIG. 1, the end 17' of the outwardly extended pin 17 being used for pushing out the pair of expanding elements 8 from inside said traverse 6'. As the clamping screw 20 is screwed in, the two expanding elements 8', 8" move apart from each other again, the reaction-springs 23 being compressed. The evening-out of the positions of the expanding elements 8', 8", inside the cross-beam tube 6', by the lever action at the points 3, 13, at which they bear against the column 1, in the contact-region 20" of the clamping screw 20, and at the end-edge 8''', against the inside surface of the cross-beam tube 6', takes place in the same manner as described above. The contact force required for clamping the cross-beam 6 to the column 1 is generated by the wedging action between the inclined centering face 14' on the head part 9, and the bearing reaction of the screw-head 20' at the outer end of the elongated hole 24. In the clamped condition, the expanding elements 8', 8" once again rest close against the inner walls 6" of the cross-beam. The rotation of the inner ends 8''' of the expanding elements 8', 8", which occurs as a result of the lever action as the clamping screw 20 is tightened, until these inner ends 8''' bear against the cross-beam walls 6", is accordingly extremely small, and is absorbed elastically by the guide pins 17.

The embodiment according to FIG. 3 can be designed, in a manner analogous to the embodiment according to FIG. 1, to possess a single guide pin 17, which is captured within the interior of the cross-beam tube 6'. To render the reaction force symmetrical, which force must be applied to one of the expanding elements 8', 8" in order to ensure appropriate parallel guidance of this expanding element, the spring arrangement must then be adapted accordingly.

I claim:

1. A supporting frame comprising support or column elements and cross-beams, said cross-beams being built in between two column elements located opposite each other in one plane, the cross-beams, at least at their ends, being provided with a cavity for receiving expanding elements guided to move in a longitudinal and transverse direction, said expanding elements being spaceable from each other by being displaceable longitudinally and laterally between a parking position and a clamping position, and are further brought in pairs into and out of engagement with said support or column elements, said expanding elements having a head piece comprising clamping means which may be pushed into said cavity, and may be forced apart by means of a tightening screw which is operable from the outside of said cross-beam, characterized by at least one guide pin fixed in one of the expanding elements and one guide pin slidably movable in the other of the expanding elements for parallel guidance and coupling of said expanding elements, whereby at least one guide pin engages by means of elongated holes into the corresponding sides of said cross-beam so that the route of the longitudinal travel of said expanding elements is defined by the end limitations of said elongated holes and there is achieved a frictional engagement between said cross-beam end and the surface of said column element.

2. A supporting frame according to claim 1, characterized in that at least one of the guide pins has an extension projecting beyond the respective narrow side of said cross-beam to force inwards the expanding element which is strongly connected therewith in order to facilitate a disengagement of said expanding elements from the respective support or column element.

3. A supporting frame according to claim 1, characterized in that said cross-beam is a rectangular tube, and compression springs acting together with each of said guide pins are arranged between one of said expanding elements and an adjacent sidewall of said rectangular tube, said compression springs forcing said expanding element against the other expanding element while said tightening screw is unscrewed.

4. A supporting frame as disclosed by claim 1 wherein said pin and said expanding elements are separable for disengagement of said expanding elements from column element.

* * * * *